United States Patent [19]
Kholin

[11] Patent Number: 4,585,167
[45] Date of Patent: Apr. 29, 1986

[54] METHOD FOR DIVIDING BULK LIQUID INTO DROPS

[76] Inventor: Boris G. Kholin, ulitsa Lenina, 107, kv. 37, Sumy, U.S.S.R.

[21] Appl. No.: 433,235

[22] Filed: Oct. 7, 1982

[51] Int. Cl.[4] .......................... B05B 1/08; B05B 17/06
[52] U.S. Cl. ...................................... 239/4; 239/102; 159/48.1; 71/64.13
[58] Field of Search ........................ 239/4, 102, 223, 1, 239/302, 337, 373, 372; 261/81, DIG. 48; 71/64.13; 159/48.1

[56] References Cited

U.S. PATENT DOCUMENTS

| | | | |
|---|---|---|---|
| 3,087,840 | 4/1963 | Shaw | 261/DIG. 48 |
| 3,719,168 | 5/1973 | Kazee | 239/223 |
| 3,734,410 | 5/1973 | Bruno | 239/102 |

FOREIGN PATENT DOCUMENTS

| | | | |
|---|---|---|---|
| 2903262 | 8/1980 | Fed. Rep. of Germany | 239/223 |
| 1335550 | 7/1963 | France | 239/223 |
| 453198 | 4/1975 | U.S.S.R. | 239/4 |

OTHER PUBLICATIONS

Generation of Uniform 0.5–10 μm, Solid Particles, Hendricks et al, J. Phys. E (GB), vol. 5, No. 9, Sep. 1972.
B. C. Holin, Tsen Trobezhye i Vibratsionnye Granvlyatory Rasplavov i Vaspyliteli Zhidkosti, M. Mashingstroenie, 1977, pp. 104–105, 166–167.

*Primary Examiner*—David L. Lacey
*Attorney, Agent, or Firm*—Burgess, Ryan & Wayne

[57] ABSTRACT

An apparatus comprises a container having discharge orifices, inlet pipes for feeding liquid and gas into this container, distributors adapted for uniformly introducing into said container the gas and the liquid, and a source of compressed gas. The apertures of the gas distributor are located above the uppermost discharge orifices of said container and the apertures of the liquid distributor are located below the uppermost discharge orifices of said container. A method of employing the apparatus comprises feeding liquid into the container and a positive pressure is provided over the free surface of this liquid. Then the liquid is caused to issue in jets from the container, which jets are dispersed to form droplets either spontaneously or under the disturbance action being applied. Depending on the required output the delivery of the liquid is controlled so that its level within the container varies between the levels of location of the uppermost and lowermost discharge orifices of the container.

13 Claims, 7 Drawing Figures

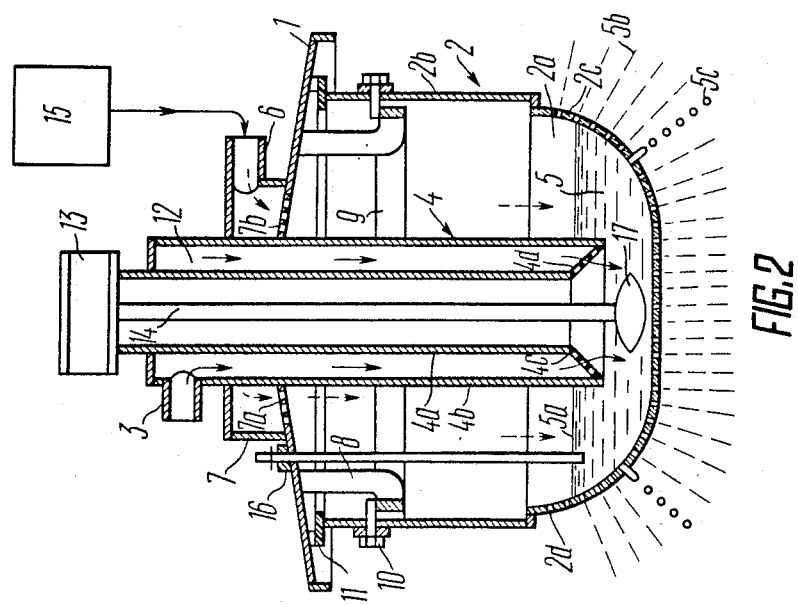
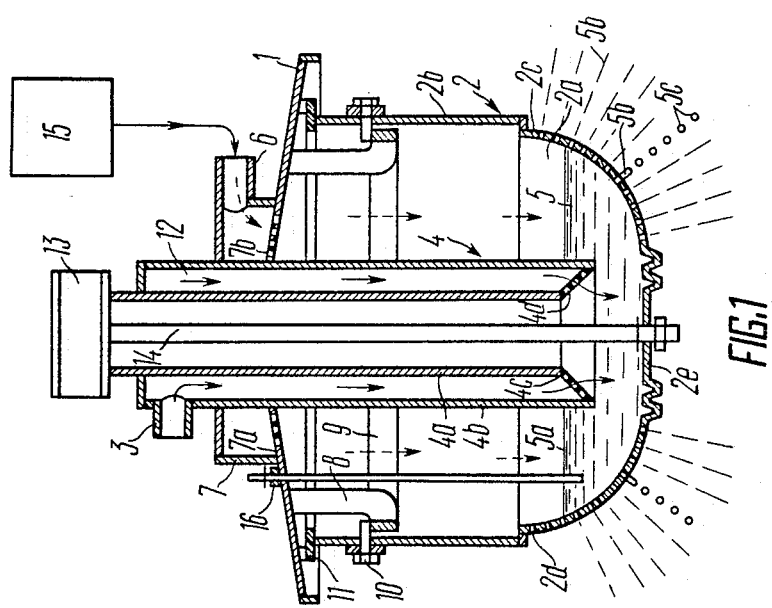

METHOD FOR DIVIDING BULK LIQUID INTO DROPS

BACKGROUND OF THE INVENTION

1. Field of the Invention

The present invention relates to methods and equipment for dividing a bulk liquid into drops. The term "liquid" is used hereinafter in the broad sense, that is it is intended to mean both liquids and melts of the normally solid materials.

This invention may be used wherever the uniform (monodisperse) drops of liquid are produced in great quantities. The invention is of particular advantage in the case of reducing any molten material to grains, for instance in producing ammonium nitrate, carbamide, sulphur, and compound fertilizers containing nitrogen, phosphorus and potassium.

2. Prior Art

It is common knowledge that granulating materials are effected in granulating towers having a considerable height from 30 to 100 m) and diameter (from 6 to 24 m). The melt is divided into drops in the upper portion of the tower. The melt drops fall down in counter-current to the upward current of the cooling air, are cooled thereby and crystallize to form grains of a spherical shape.

An important problem which is encountered in the practice of granulating materials is the provision of such an apparatus for reducing liquids to drops which being economic in use, simple in construction, relatively not expensive, and highly reliable in operation, would provide for:

(1) producing drops having a predetermined uniform size and a maximum degree of dispersion;

(2) possibility to change in a wide range the output of the apparatus per unit of time without changing the size thereof and affecting the degree of monodispersion of the drops;

(3) such a movement of the drops in the air at the outlet of these apparatus, wherein the drops do not collide and collapse as a result.

Many attempts have been made to solve the above problem, but no satisfactory solution has been proposed so far.

The most efficient among the prior art methods of dividing liquid into drops is a method wherein the liquid to be divided is fed into a perforated container having discharge orifices located at different levels, with the rate of feeding the liquid being controlled depending on the required output, and caused to issue from said orifices in jets with simultaneously maintaining a positive pressure over the free surface of said liquid within said container. The liquid jets thus obtained are divided into drops. (cf. B. G. Holin, "Tsentrobezhnye i vibratsionnye granulyatory rasplavov i raspyliteli zhidkosti", M., Mashinostroenie, 1977, pp. 104–105, ris. 64). According to the method discussed the level of the liquid in the perforated container is maintained constant within the whole range of the feed rate of said liquid so that all the discharge orifices are below the free surface of the liquid and the liquid feed control is effected by varying the pressure over said liquid.

In this case with the change of the liquid feed rate the velocity of the liquid issuing in jets from said container proportionally changes.

An apparatus to carry out the above method comprises a body and a perforated container mounted thereon and provided in its lower portion with a plurality of discharge orifices for outflow of the liquid located at different levels, a compressed gas source, and inlet pipes for feeding said gas and liquid into the cavity of said container. (cf. B. G. Holin, the work referred to above, on the same pages). This apparatus further includes a liquid distributor which communicates with the liquid inlet pipe and has apertures for uniformly introducing the liquid into the perforated container. The constant level of the liquid in this apparatus is provided with the aid of a level controller of a float type.

In spite of apparent advantages that the above method and apparatus have there is a number of difficulties which are encountered when carrying said method into effect with the use of said apparatus.

Thus, in the case of a necessity to considerably change the output of the apparatus (for example, from 2 to 10 times) the rate of feeding the liquid into the perforated container must be proportionally changed, in which case according to this method the gas pressure over the free surface of said liquid within said container has also to be changed, which results in a sharp change of the velocity of the liquid flowing out from said container. As a result the separate jets of the liquid may, in some cases, flow together in the form of a shapeless flow of liquid running over the outer surface of the perforated container.

This results in that the size and weight of the drops are not uniform. Their falling velocity and time in the granulating tower increase or decrease, which in turn disturbs the predetermined conditions of their cooling, thereby affecting the quality of the granules being formed.

Thus, when carrying into effect the prior art process with the aid of the above apparatus the predetermined shape and size of the granules being formed can be obtained only within a narrow range of the output of the apparatus.

To enable controlling the output of the apparatus in a wider range without significant decline in the quality of the granules being formed it becomes necessary to use complex systems including several apparatuses of the above type operating in parallel. A coarse adjustment of the system to provide a required output is effected by operating a selected number of the apparatuses combined in such a system, and a precise adjustment is effected by varying the pressure of gas over the free surface of the liquid simultaneously in all the operating apparatuses (cf. B. G. Holin, the work referred to above, p. 167, FIG. 99).

This, however, complicates to a great extent operating such apparatuses and the granulating tower as a whole, causes higher expenses to carry out granulating operations, and involves more attending personnel.

It should also be noted that this process of dispersion creates conditions for intensive adhering and sticking together of the granules being formed in the lower portion of the granulating tower, which decreases the average output thereof, requires more frequent outages for cleaning, and makes it more hazardous for the attending personnel because of possible crumbling and failure.

Furthermore, the droplets formed with the aid of the prior art apparatus may collide while falling down, thereby affecting their initial shape and weight.

All the above disadvantages are responsible for that the above method and the apparatus are not used on a wide industrial scale.

SUMMARY OF THE INVENTION

The principal object of the present invention is to provide a method and apparatus for dividing a bulk liquid into droplets, which allow controlling in a wide range the output of the apparatus with simultaneously ensuring a high degree of monodispersion of the drops being formed.

Another not less important object of the invention is to provide a method and apparatus wherein controlling the output per unit of time is achieved with the aid of simple technique without involving a complex equipment requiring a highly skilled attending personnel.

A further object of the invention is to provide a highly economic apparatus for dividing liquids into drops, which does not require much labour for operating it.

An additional object of the invention is to provide a method wherein the conditions for outflowing of liquid in the form of jets are not distorted when the operating conditions of the apparatus are sharply changed as, for instance, in the case of starting or stopping the operation of the apparatus.

Among other objects of the invention is to provide an apparatus for dispersion simple in construction and reliable in operation, which is suitable for a wide scale industrial use, and in particular for the purpose of granulation of materials.

These and other objects of the invention are attained in that in a method comprising the steps of delivering a liquid into a perforated container having discharge orifices disposed at different levels, controlling the rate of delivery depending on the required output per unit of time, causing said liquid to issue in jets from the orifices of said container with simultaneously maintaining a positive pressure of gas over the free surface of the liquid in said container, and subsequently dividing the issuing jets into drops, according to the invention the positive pressure over the liquid is maintained constant within the whole range of varying the rate of delivery of liquid, and the rate of delivering said liquid is controlled so that within the whole range of the delivery rate control the level of the liquid in the perforated container is varied within the limits defined by the levels of location of the uppermost and lowermost discharge orifices.

With this method of dispersion of liquid the velocity of jets of the liquid issuing from the perforated container is mainly determined not by a liquid column in this container but by the gas pressure over the free surface of the liquid. Since the pressure of gas according to the proposed method is maintained constant, the velocity of the liquid issuing from the orifices which are below the free surface of the liquid (i.e. covered by the liquid) will be practically constant. In this case the gas will pass through those orifices which are above the free surface of said liquid.

When the output of the apparatus is changed (which is done by varying the rate of delivering the liquid into the perforated container) the number of the orifices through which the liquid outflows is proportionally changed, the change in the number of the orifices through which the liquid outflows occurs without intervention of the operator, that is automatically. The velocity of the liquid flowing in jets from the container at any rate of the liquid delivery remains substantially constant, which provides for that the droplets and hence granules being formed are uniform in size and weight. In addition, the thus stabilized process of formation of the droplets rules out adhering and sticking together of the granules being formed in the lower portion of the granulating tower at the moments of its being started and stopped, which improves the operating conditions and the efficiency of the granulating operation.

It is desirable that the constant pressure of gas, maintained over the free surface of the liquid, be selected from $10^3$ to $2.5 \times 10^4$ Pa. It has been established by experiments that the pressure selected within this range provides to best advantage a higher degree of monodispersion of the droplets being formed.

It is expedient that the gas exerting a pressure onto the liquid be heated to a temperature higher than the crystallization temperature of said liquid. This will rule out a premature crystallization of the liquid in the orifices of the perforated container at low rates of delivery of the liquid (at a relatively low output) when the level of the liquid within said container is not high and a part of the orifices may be clogged up as a result of such crystallization.

It is further expedient that the liquid supplied to the perforated container be delivered to the lower portion thereof below the free surface of the liquid in this container, which will prevent the formation of turbulent motion and waves on the free surface of the liquid within the perforated container, thereby providing favorable conditions for the outflow of the liquid in the form of jets, and hence a stable shape, weight, and size of the droplets.

It is highly advantageous that the constant value of the gas pressure be superposed with a pulsating component having a frequency of from 1 to 20 Hz and an amplitude which is from 3 to 5 times lower than said constant value of the gas pressure. Such a low-frequency pulsating component allows, without significantly affecting the stability of the pressure, the droplets formed at the outlet of the perforated container to scatter as much as possible, thereby ruling out heating up of the particles by the "hot tracks" left by the previous particles, and thus improving the conditions of cooling and crystallization of the droplets into granules.

Such scattering of the liquid droplets may also be obtained by using other modifications of the proposed method, wherein the perforated container is caused either to rotate about its vertical axis at a speed of rotation of from 15 to 120 rpm, or to oscillate about the same axis at a frequency of from 1 to 50 Hz with the travel of the orifices most remote from said axis being from 1 to 150 mm, simultaneously maintaining the gas pressure constant.

To provide a more rapid division of the liquid jets into droplets it is advisable that, simultaneously with maintaining the gas pressure constant, the jets of the liquid be disturbed so as to form on the surface thereof capillary waves with a wave length of from 2.5 to 15 times the diameters of the jets.

This disturbance of the liquid jets may be caused, for instance, by:

(1) longitudinally (axially) oscillating the perforated container or the lower portion thereof;

(2) transversely oscillating said container;

(3) exciting in the liquid within said container acoustic vibrations;

(4) exciting acoustic vibrations in the medium surrounding the liquid jets;

(5) acting on the liquid jets by a.c. or magnetic field, etc.

It will be advantageous in this case that the same gas which is used to provide a positive pressure in the perforated container to be also used as a source of said disturbances. To this end acoustic vibrations with a frequency of from 100 to 2000 Hz are excited in the gas, which vibrations are transmitted through the liquid in the perforated container to the jets of the liquid issuing from the orifices, thereby facilitating the division of said jets into monodisperse drops.

These and other objects of the invention are also attained in that in an apparatus for dividing liquid into droplets, which comprises a body, a perforated container mounted on said body and having in its lower portion a plurality of discharge orifices for the liquid to outflow through, located at different levels, a compressed gas source, a gas inlet pipe, and a liquid inlet pipe for introducing the liquid into said container, provided with a liquid distributor having apertures adapted for uniformly introducing the liquid, according to the invention there is further provided a gas distributor being mounted in said body, communicating with the gas inlet pipe and having apertures adapted for uniformly introducing the gas into said container, the apertures of the gas distributor being located above the level of location of the uppermost discharge orifices of the perforated container and the apertures of the gas distributor being located below said uppermost discharge orifices.

Such construction of the apparatus permits the proposed method to be readily carried into effect. The presence of the liquid distributor, apart from the gas distributor, and the above arrangement of the apertures of these distributors allows varying to best advantage the number of the orifices through which the liquid outflows and correspondingly that of the orifices through which the gas passes, depending on the required output of the apparatus. This provides for a practically constant velocity of outflow of the liquid within the whole range of varying the rate of delivering said liquid into said perforated container, thereby enabling the formation of the drops and granules with a high degree of monodispersion.

If the proposed apparatus is used to carry out the above modification of the proposed method wherein as a source of disturbance use is made of the gas, it is expedient to use the proposed apparatus modification wherein said apparatus further includes a gas flow pulser made in the form of a stator and a rotor and located at the place where said gas is introduced into the perforated container. In this case the stator is provided with at least one gas outlet duct, and the rotor is mounted for rotation relative the stator and have working members uniformly disposed in a circle, which working members are adapted to partially or completely close the outlet duct of the stator when the rotor rotates. The number (Z) of said working members is determined from the relationship:

$$Z = 60f/n,$$

where
f is a disturbance frequency superposed onto the liquid jets, Hz, and
n is a speed of rotation of the rotor, rpm.

Due to the presence of such a pulser the gas is introduced into the perforated container in the form of pulses with a frequency equal to the predetermined disturbance frequency superposed onto the jets of the liquid, which, as it has been shown above, facilitates the division of said jets into monodisperse drops.

Said pulser may be variously otherwise constructed. For instance a modification is possible wherein the stator of the pulser is made in the form of a disc having apertures disposed in a circle, which apertures being said gas outlet ducts, and the rotor is made in the form of a second disc arranged coaxially with the first disc and having grooves and projections adapted to alternately close each aperture of the stator. Said projections are the working members of the rotor and their number equals the number of the apertures of the stator.

In a simpler and preferred modification the pulser and the source of compressed gas are combined and made in the form of a fan having a stator provided with one gas outlet duct, and a rotor fitted with blades which are working elements thereof and adapted to alternately close the portion of the outlet duct of the stator. In the case of this modification there is no need to use a vibrator or any other source of vibrations to produce disturbances applied to the jets of the liquid, which brings down expenses in carrying out the proposed method.

In order to amplify oscillations caused in the gas by the pulse gas feed use may be made of another modification of the proposed apparatus wherein there is provided a resonator tuned to the disturbance frequency applied to the jets of the liquid. Such resonator may be made, for instance, in the form of a chamber of a variable volume, communicating with the perforated container and the gas inlet pipe, or in the form of an elastic ring mounted substantially in a horizontal plane in the lower portion of said container. It is quite evident that these two modifications may be used either separately or in combination.

BRIEF DESCRIPTION OF THE DRAWINGS

The nature of the present invention will be clear from the following description, taken in conjunction with the accompanying drawings in which:

FIG. 1 schematically represents in longitudinal section the proposed apparatus for carrying out the proposed method for dividing a bulk liquid into drops.

FIG. 2 illustrates a modification of the apparatus shown in FIG. 1, wherein the liquid being divided is disturbed by an oscillating body located therein (acoustic vibrator);

DETAILED DESCRIPTION OF THE INVENTION

Figure 3:
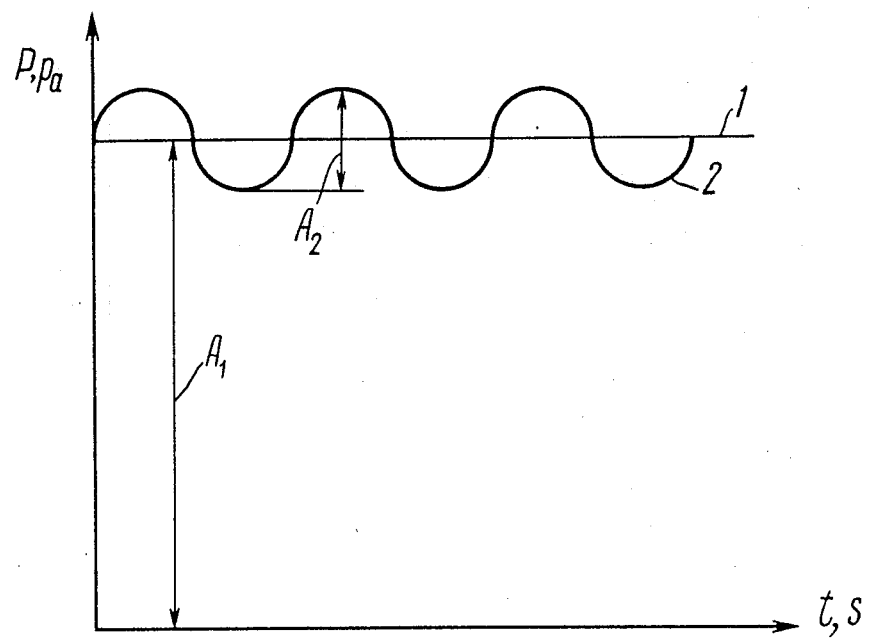
FIG. 3 is a diagram of superposing a pulsating component onto the gas pressure constant value according to the proposed method.

An apparatus to carry out the proposed method for dividing liquid into drops comprises a body 1 (FIG. 1), a perforated container 2 mounted on the body 1, an inlet pipe 3 provided with distributor 4 for feeding liquid, in particular a melt 5 into a cavity 2a of the perforated container 2, and an inlet pipe 6 provided with a gas distributor 7 for feeding gas, for instance air, into the container 2, the air being introduced above the surface level of the melt 5.

Connected to the enclosure 1 with the aid of supports 8 is a ring 9 carrying the container 2 secured to said ring with the aid of the bolts 10. Between the enclosure 1 and the container 2 is disposed a gasket 11 made for instance from rubber or fluoroplastic and adapted for self-sealing of the cavity 2a of the container 2 when the air is fed thereinto.

The container 2 has a continuous upper portion 2b and a perforated lower portion 2c. The orifices 2d of the lower portion of the container 2 are adapted for the melt to outflow and are located at different levels as shown in FIG. 1. A central part 2e of the lower portion 2c of the container 2 is not perforated.

The distributors 4 and 7 may be variously constructed. In this particular case the melt distributor 4 is made in the form of pipes 4a and 4b arranged within one another and connected in their lower part through a conic bottom 4c. Between the pipes 4a and 4b there is provided an annular groove 12 for the melt 5 to pass from the inlet pipe 3. In the bottom 4c there are provided apertures 4d for the melt 5 to be uniformly introduced into the cavity 2a of the perforated container 2, which apertures 4d are located below the level of location of the uppermost orifices 2d of the container 2.

The air distributor 7 is an annular chamber communicating with the inlet pipe 6 and having a perforated bottom 7a provided with apertures 7b located above the level of location of the uppermost orifices 2d of the container 2, as shown in FIG. 1, and adapted to uniformly introduce the air into the cavity 2a of the container 2.

The level at which there are located the apertures 4d of the melt distributor 4 and the apertures 7b of the air distributor 7 with respect to the orifices 2d of the container 2, and the height of the perforated portion thereof are selected depending on specific technological requirements. As it may be apparent to those skilled in the art a special mechanism may be readily incorporated in the proposed apparatus, adapted for vertically moving the distributors 4 and 7 so as to position them to a predetermined height.

Shown in FIG. 1 is a preferable modification of the proposed apparatus, wherein there is further provided a vibrator 13 mounted on the inner pipe 4a of the melt distributor 4 and connected with the non-perforated part 2e of the container 2 through a rod 14 extending through the pipe 4a. This vibrator 13 is adapted to excite vertical oscillations of said part 2e of the perforated container 2 so as to disturb the jets of the liquid and to thereby facilitate the formation of the drops.

The apparatus also includes a compressed air source 15 communicating with the inlet pipe 6. This source 15 of compressed air may be made in the form of a fan or any other conventional means.

Further, the apparatus is also provided with a piezometer tube 16 secured on the body 1 and serving as a detector of the melt 5 level within the container 2. The tube 16 may be used for measuring a pressure within the container 2.

Applying disturbing action to the outflowing liquid jets may be variously otherwise effected as, for instance, shown in FIG. 2. According to this modification an acoustic radiator 17 for exciting acoustic waves in liquid is secured on the rod 14, said radiator having a predetermined shape, for instance, of an ellipsoid (as shown in the accompanying drawings) or a disc. In this case the lower portion 2c of the container 2 is perforated over its whole surface and is not connected with the rod 14.

This modification, as compared to that shown in FIG. 1, is more convenient in maintenance and repair for it does not require detachment of the rod 14 from the container 2.

The proposed method is carried into effect with the use of the apparatus disclosed above in the following manner. First (in case when dividing the liquid into drops is only an operation step of the whole granulating operation) the proposed apparatus is mounted in the upper part of a granulating tower (not shown). Thereafter, air is fed under a constant pressure (the direction of movement of said air is shown by dotted arrows) from the compressed air source 15 through the inlet pipe 6 (FIG. 1) and the distributor 7 into the cavity 2a of the container 2. The rate of air supply is controlled so that in spite of the air outflow through the orifices 2d of the container 2, the pressure within the cavity thereof does not substantially change. As indicated above, the air being fed may have any temperature, but preferably is heated to a temperature above the crystallization temperature of the melt.

Then the melt 5, for instance ammonium nitrate melt which is prepared in an outside (i.e. not related to the present invention) apparatus (not shown in the accompanying drawings) is fed through the inlet pipe 3 into the distributor 4. The melt 5 passes along the annular groove 12 and then through the apertures 4d into the lower portion 2c of the container 2, as shown by solid arrows, to fill the portion of the cavity 2a to a predetermined level and to form a free surface 5a located between the level of location of the uppermost discharge orifices and that of the lowermost discharge orifices 2d in the container 2. Due to a positive pressure produced over the free surface 5a of the liquid 5, which pressure being maintained constant, the melt 5 from the very beginning it is introduced into the container begins to outflow in the form of jets 5b from the orifices 2d of the container 2 which are located at a given moment below the free surface 5a of the melt 5, which jets are divided into drops 5c. Simultaneously, through the orifices 2d which are located above the free surface 5a of the melt 5 the air outflows. The velocity of the liquid outflowing in jets 5b, from the moment the liquid is introduced into the container 2 and to the moment when it reaches a predetermined level of the liquid 5, will remain practically constant and corresponding to the predetermined value.

Should a need arise to change the output of the apparatus, for instance, if said output is to be increased, the rate of feeding the melt 5 into the container 2 is increased so as not to exceed a maximum rated consumption of the melt 5. At a maximum rated load the level of the melt will reach the steady value substantially at the level of the uppermost discharge orifices 2d of the container. The liquid 5 is simultaneously flowing from all the orifices 2d of the container 2 in the form of the jets 5b practically at the same velocity as before.

When the delivery of the melt 5 into the container 2 is decreased or stopped, the level of the melt in the container 2 lowers, in which case the number of the orifices 2d through which the melt is outflowing decreases, while the number of the orifices 2d which are located above the free surface 5a of the melt 5 and through which the air is outflowing increases.

It is to be noted that within the whole range of varying the rate of feeding the melt 5, the air pressure over said melt is maintained constant in the range of from $10^3$ to $2.5 \times 10^4$ Pa, and feeding the melt 5 is controlled so that the level of the free surface 5a of the melt varies substantially between the level of location of the uppermost discharge orifices 2d and that of the lowermost discharge orifices 2d of the container 2.

In order to lower the probability of sticking together of the drops in their flight and improve their cooling conditions a pulsating component is superposed onto a constant value of the air pressure over the free surface 5a of the melt 5, which pulsating component superposition is illustrated on the diagram in FIG. 3 showing the dependence of the air pressure (P) on time (t): line 1 represents the constant component, and line 2 is the pulsating component. The frequency of the pulsating component is selected from 1 to 20 Hz and its amplitude $A_2$ is 3 to 5 times lower than the value $A_1$, of the constant component. Superposition of the pulsating component onto the constant component may be readily effected with the use of conventional means such as, for instance, an oscillating valve (not shown) mounted before the air inlet pipe 6 (FIG. 1). With this pulse air pressure the droplets scatter moving along different paths, thereby improving the quality of the granules being formed.

The above effect may also be obtained by simultaneously maintaining the air pressure constant while the container 2 is rotated with the aid of any suitable conventional means (not shown) about its vertical axis with a speed of rotation of from 15 to 120 rpm, or is oscillated about the same axis at a frequency of from 1 to 50 Hz and an amplitude of oscillation of the orifices 2d most remote from said axis, being from 1 to 150 mm.

The degree of monodispersion of the droplets (their size and weight) and hence the granulometric composition of the granules being formed may be improved by simultaneously maintaining the air pressure over the free surface of the liquid constant, while the jets 5b of the liquid are disturbed so as to form on the surface thereof capillary waves having a wave length of from 2.5 to 15 times the diameter of the jet. To this end the vibrator 13 is energized, which vibrator transmits through the rod 14 high-frequency oscillations (100 ... 2000 Hz) to the melt 5, said oscillations being applied to said melt either directly, or through the radiator 17 (FIG. 2), through the intermediate wall i.e. portion 2e of the container 2 (FIG. 1).

It is also possible that the same gas which is used to produce a positive pressure over the melt 5 be used as a source of high-frequency disturbances, by exciting in this air acoustic oscillations with a frequency of from 100 to 2000 Hz. The modifications of the apparatus for carrying out this embodiment of the proposed method are illustrated in FIGS. 4 to 7.

All these modifications of the apparatus invariably include a gas flow pulser made, in particular (FIG. 4), in the forms of two discs 18 and 19 coaxially mounted in spaced relationship in the body 1. The first (lower) disc 18 is a stationary one and serves as a stator of said pulser. It has apertures 18a for the air to pass, located in a circle (FIGS. 5 and 6), and the second (upper) disc 19 has grooves 19a and projections 19b, and is connected through a shaft 20 with a drive (not shown). The shaft 20 is supported in bearings 21 on a cover 22 secured on the body 1. The number of the apertures 18a in the disc 18 equals the number of the projections 19b (grooves 19a) on the disc 19.

The projections 19a of the rotor 19 are working members of said pulser, adapted to alternately close the apertures 18a when the rotor 19 rotates, thereby opening (FIG. 5) and closing (FIG. 6) them. The number (Z) of the working members of the pulser (in this particular case pprojections 19b) is determined from the relationship:

$$Z = 60f/n,$$

where
f is a disturbance frequency superposed on the jets of the melt, which frequency, as shown above, is selected from 100 to 2000 Hz;
n is a speed of rotation of the rotor, rpm.

When the apparatus of this modification operates and the apertures 18a of the disc 18 are periodically closed by the projections 19b of the disc 19 the air is caused to pulsate with a required frequency f ensuring division of the jets of the melt into monodisperse drops.

In this modification there are also provided orifices 2f located in the upper portion 2b of the container 2 and adapted to release excessive air from the cavity 2a thereof.

In another modification of the proposed apparatus (FIG. 7) said gas flow pulser and the source of compressed gas are combined in the form of a fan 23 including a stator 24 having one air outlet duct 24a and a rotor 25 fitted with two blades 25a which serve as working members of said pulser and are adapted to alternately close a portion of the air outlet duct 24a of the stator 24. The number (Z) of the blades of the fan is also determined from the above relationship.

Figure 4:
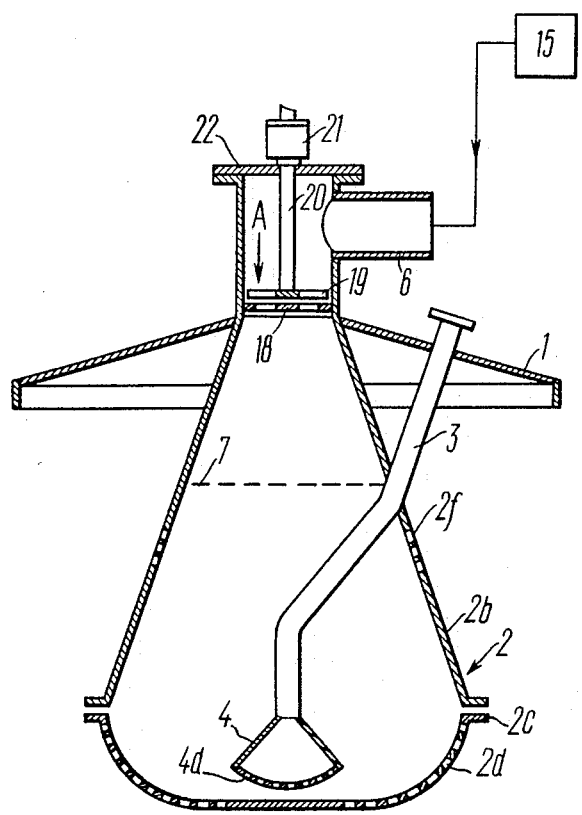
FIG. 4 is a modification of the proposed apparatus including a gas flow pulser in the form of two discs.
Figure 6:
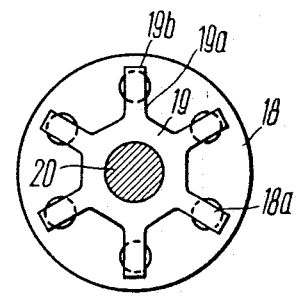
FIGS. 5 and 6 show two positions when the discs of the pulser of FIG. 4 are relatively rotating (a view along arrow A in FIG. 4)
Figure 5:
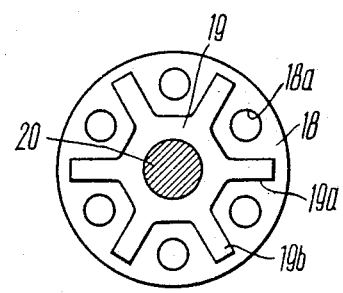
Figure 7:
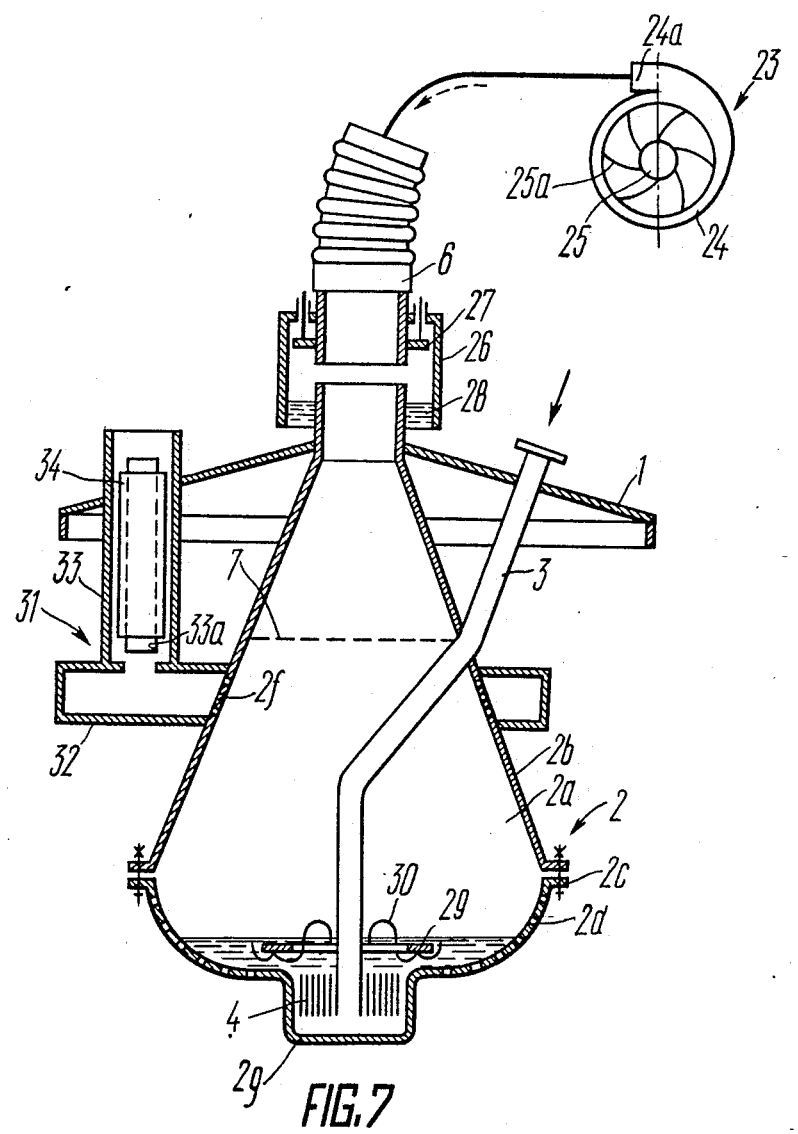
FIG. 7 shows another modification of the proposed apparatus including a resonator, and wherein the pulser and the compressed gas source are combined in the form of a fan.

This modification of the apparatus operates in a substantially similar manner as that shown in FIGS. 4 to 6. It is clear, however, that combination of the pulser and the compressed gas source in one device (fan), as shown in FIG. 7, simplifies to a great extent the construction of the proposed apparatus without affecting its advantages.

This modification of the apparatus also includes a resonator made in the form of a chamber 26 having a variable volume, mounted on the body 1 and communicating with the cavity of the perforated container 2 and the air inlet pipe 6. Varying the volume of this chamber 26 is effected with the aid of a movable ring piston 27 introduced into said chamber 26. By moving said piston the chamber 26 is tuned to a required frequency of disturbance of the jets of the melt so as to cause a resonance.

Said chamber 26 may be tuned in a different way, for instance, by filling it to a required volume with a suitable liquid 28. It is evident that for tuning the chamber 26 both of the above methods may be used in combination.

The above resonator may be otherwise constructed, for instance, in the form of an elastic ring 29 mounted substantially horizontally in the lower portion 2c of the container 2 on elastic supports 30. It is to be noted that all the above modifications of the resonator may be used both in combination (FIG. 7) and separately. Using them in combination is preferable for it ensures a more effective disturbance of the jets 5a of the melt 5.

In addition, the apparatus of this modification includes an air pressure regulator 31 within the container 2, which regulator is made in the form of an annular collector 32 provided with a vertical connection pipe 33 having a slot 33a, and a solid piston 34 mounted in said connection pipe 33 for axial movement. The collector 32 is mounted on the perforated container 2 and communicates with the cavity 2a thereof through the orifices 2f provided in this container 2 and located above the discharge orifices 2d.

In this particular case the container 2 is made dismountable and in its lower portion 2c is provided a recess 2g. The liquid distributor 4 is made in the form of a regular packing secured on the inlet pipe 3 and disposed in the recess 2g of the container 2. Such construction of the liquid distributor 4 allows introducing the liquid 5 into the container 2 below the lowermost orifices thereof without causing turbulent motion of the liquid 5, which enables forming monodisperse droplets even at minimum loads.

The modification of the proposed apparatus shown in FIG. 7 operates substantially in a similar manner as disclosed above. Due to the presence of the resonator (in the form of the chamber 26 or elastic ring 29) the disturbance upset of the jets 5b of the melt 5, caused by the fan 23 is considerably increased. If the amount of the melt 5 fed into the container 2 is changed, the number of the orifices 2d thereof from which the liquid 5 is outflowing also changes as has been shown above. During the whole period in which the air is continuously fed under pressure by the fan 23, the air pressure (P) within the container 2 is maintained constant and equals $P = mg/F$, where m and F are a mass and a surface area of the piston 34, respectively, and g is a free fall acceleration. The excessive air resulting from the positive pressure is continuously released from the container 2 through the orifices 2f, along the collector 32, and then discharged through the portion of the slot 33a located at this very moment under the piston 34. If the rate of feeding the melt 5 is increased or decreased this portion of the slot 33a increases (the piston moves upward) or decreases (the piston moves downward), thereby providing a constant pressure of the air within the cavity 2a of the container 2.

It should be noted that the proposed method and apparatus, when used for granulating operations, enable producing granulated fertilizer featuring a higher degree of monodispersion than before. A higher degree of monodispersion raises in turn the agricultural value of the fertilizer, since it allows a more uniform spreading of said fertilizer over arable land, thereby favouring better crops.

The invention will now be explained in terms of specific embodiments.

EXAMPLE 1

A batch of ammonium nitrate having a crystallization temperature of 167° C. was dispersed and granulated in accordance with the proposed method carried out with the use of the apparatus described above. The melt was fed into the lower portion of the perforated container, with the temperature of the air fed into the container being 170° C., i.e. higher than the crystallization temperature of the melt. The air pressure over the free surface of the melt was maintained constant and constituted 1000 Pa. The perforated container had 2400 discharge orifices of 1.2 mm in diameter. The output of the apparatus was varied from maximum (14 tons per hour) to minimum (1.4 ton per hour). In this case the number of the discharge orifices through which the melt was outflowing also varied from 2400 to 240.

This granulating operation resulted in, within the whole range of controlling the feed rate of the melt, high quality granules of the following granulometric composition being obtained: granules larger than 3 mm in size from 2.7 to 4.2%, 2 to 3 mm size granules (required fraction) from 65 to 75%, granules smaller than 1 mm in size from 0.1 to 0.8%, and 1 to 2 mm size granules balance.

EXAMPLE 2

A granulating operation was carried out in a similar manner as in Example 1. The air pressure was maintained at the level of $2.5 \times 10^4$ Pa. The granules thus produced were substantially of the same granulometric composition as in Example 1.

EXAMPLE 3

A granulating operation was carried out in a similar manner as in Example 1. The air pressure was 6000 Pa. In this case, however, the surface of the jets was disturbed by disturbance produced with the aid of a vibrator, the disturbance frequency being 560 Hz and the disturbance wave length being equal to 2.5 times the diameter of the melt jets.

The granules thus obtained had the following granulometric composition: larger than 3 mm—1.2%, 2 to 3 mm—80%, smaller than 1 mm—1.1%, 1 to 2 mm—balance.

EXAMPLE 4

A granulating operation was carried out in a similar manner as in Example 3. The disturbance wave length was equal to 5.5 times the diameter of the melt jet.

Up to 95% of monodisperse granules thus produced were 2.3 mm in size.

EXAMPLE 5

A granulating operation was carried out in the same way as in Example 3. The disturbance wave length in this case was 15 times the diameter of the melt jet.

More than 95% of monodisperse granules thus produced were 3.2 mm in diameter.

EXAMPLE 6

A granulation operation was carried out in the same way as in Example 1, except that this time the constant value of the air pressure was superposed with a pulsating component having a frequency of 1 Hz, and an amplitude 3 times less than the value of the constant air pressure. As a result, the amount of the granules of 2 to 3 mm in diameter increased to 80%.

EXAMPLE 7

A granulating operation was carried out in the same way as in Example 6. This time, however, the frequency of the pulse air feed was 20 Hz, and the amplitude was 5 times less than the value of the constant air pressure.

The results thus obtained were substantially the same as in Example 6.

EXAMPLE 8

A granulating operation was carried out in the same way as in Example 6. In this case, however, the pulsating component frequency of the air pressure was 10 Hz, and the amplitude was 4 times less than the value of the constant air pressure. The results thus obtained were substantially similar to those in Example 6.

EXAMPLE 9

A granulating operation was carried out in the same way as in Example 1, except that the perforated container was rotated at 15 rpm, the air pressure being simultaneously maintained at the level of 4500 Pa.

With this procedure less droplets were sticking together in flight, which resulted in the degree of monodispersion of the granules being raised to 85%.

EXAMPLE 10

A granulating operation was carried out in the same way as in Example 9, except that the speed of rotation of the perforated container was 60 rpm.

The results thus obtained were substantially similar to those in Example 9.

EXAMPLE 11

A granulating operation was carried out in the same way as in Example 9, except for that the speed of rotation of the perforated container was 120 rpm.

The results thus obtained were substantially similar to those in Example 9.

EXAMPLE 12

A granulating operation was carried out in the same way as in Example 1. This time, however, the perforated container was oscillated about its vertical axis with a frequency of 1 Hz, and an amplitude of oscillation (i.e. travel) of its orifices most remote from its axis being 150 mm, simultaneously maintaining the air pressure of 4500 Pa constant.

The jets of the melt were acted upon by disturbance action, with the length of the disturbance frequency being equal to 5.5 times the diameter of the jet.

As a result, less droplets were sticking together in flight, which improved the degree of monodispersion of the granules of 2.3 mm in size up to 96%.

EXAMPLE 13

A granulating operation was carried out in the same way as in Example 12, except that the perforated container was oscillated about its vertical axis at a frequency of 25 Hz, the amplitude of oscillation of its orifices most remote from said axis being 25 mm.

The results thus obtained were substantially similar to those in Example 12.

EXAMPLE 14

A granulating operation was carried out in the same way as in Example 12, except that the perforated container was oscillated about its axis at a frequency of 50 Hz, and the travel of the discharge orifices most remote from the axis of the container was 1 mm.

The results thus obtained were substantially similar to those in Example 1.

EXAMPLE 15

A granulating operation was carried out in the same way as in Example 1, except that acoustic vibrations with a frequency of 100 Hz were produced in the air, the air pressure within the container being 1000 Pa.

The degree of monodispersion of the granules of 2 to 3 mm in size increased to 95%.

EXAMPLE 16

A granulating operation was carried out in the same way as in Example 15, except that the frequency of acoustic vibrations of the air was 600 Hz. The air pressure was maintained at 4500 Pa.

The results thus obtained were substantially similar to those in Example 15.

EXAMPLE 17

A granulating operation was carried out in the same way as in Example 15, except that the frequency of acoustic vibrations of the air was 2000 Hz. The air pressure was 10,000 Pa. The diameter of the discharge orifices was 0.5 mm.

The degree of monodispersion of the granules of 1 mm in diameter constituted 90%.

EXAMPLE 18

A batch of carbamide melt having a crystallization temperature of 132° C. was dispersed and granulated substantially in a similar manner as in Example 1 (i.e. in the case of ammonium nitrate), except that nitrogen was used instead of air. The pressure of nitrogen was maintained at the level of 4000 Pa, and the temperature thereof was 142° C. The perforated container had 3000 discharge orifices 1.1 mm in diameter. The jets of the liquid were disturbed by applying thereto a disturbance action, with the length of the disturbance wave being equal to 6 times the diameter of the melt jet.

The output of the apparatus was varied from 32 to 3.2 tons per hour, and the number of the discharge orifices through which the melt was outflowing varied from 3000 to 300 as a result.

This granulating operation resulted, within the whole range of controlling the melt feed rate in high quality granules of the following granulometric composition being obtained: granules larger than 3 mm in size—0%, granules of 2 to 3 mm in size—98.4 to 99%, granules smaller than 1 mm in size—0.1 to 0.3%, and the granules of 1 to 2 mm in size—balance.

Practically, all the granules of the 2–3 mm fraction were 2.2 mm in diameter, i.e. were monodisperse granules.

While particular embodiments of the invention have been shown and described, various modifications thereof will be apparent to those skilled in the art and therefore it is not intended that the invention be limited to the disclosed embodiments or to the details thereof and the departures may be made therefrom within the spirit and scope of the invention as defined in the claims.

What is claimed is:

1. A method of dividing a bulk liquid into drops, comprising the steps of:
    (a) delivering a liquid in a range of flow rates into a perforated container so that it will be divided, said container having discharge orifices located at different levels and said liquid having a free surface;
    (b) causing said liquid to outflow in jets from said discharge orifices of said perforated container;
    (c) simultaneously maintaining a constant positive gas pressure over the free surface of the liquid in said perforated container within the entire range of flow rates in the delivery of the liquid and
    (d) dividing said liquid jets into drops.

2. A method as claimed in claim 1, wherein the constant positive pressure of the gas is selected in the positive pressure range of from $10^3$ to $2.5 \times 10^4$ Pa.

3. A method as claimed in claim 1, wherein a gas is employed to maintain said constant positive gas pressure and it is heated to a temperature higher than the crystallization temperature of the liquid being divided.

4. A method as claimed in claim 1, further comprising the step of delivering the liquid into a lower portion of said perforated container for forming the free surface of the liquid and further delivering the liquid below the free surface of the liquid in said container.

5. A method as claimed in claim 1, further comprising the step of superposing on the constant pressure of the gas, a pulsating component having a frequency of from 1 to 20 Hz, and an amplitude which is 3 to 5 times lower than the value of the constant gas pressure.

6. A method as claimed in claim 1, further comprising the step of rotating said perforated container about its vertical axis at a speed of from 15 to 120 rpm.

7. A method as claimed in claim 1, further comprising the step of oscillating said perforated container about its vertical axis at a frequency of from 1 to 50 Hz with the amplitude of oscillation of the discharge orifices most remote from said vertical axis being from 1 to 150 mm.

8. A method as claimed in claim 1, further comprising the step of applying a disturbance action to the jets of the liquid so as to form on the surface of said jets capillary waves having a length of from 2.5 to 15 times the diameter of the jets.

9. A method as claimed in claim 8, further comprising the step of superposing on the constant pressure of gas, a pulsating component having a frequency of from 1 to 20 Hz and an amplitude from 3 to 5 times lower than the value of the constant gas pressure.

10. A method as claimed in claim 8, further comprising the step of using the same gas to produce a positive pressure over the liquid in said perforated container and as a source of disturbance of the liquid jets by exciting in said gas acoustic vibrations, with a frequency of vibration being from 100 to 2000 Hz.

11. A method as claimed in claim 10, further comprising the step of rotating said perforated container about its vertical axis at a speed of from 15 to 120 rpm.

12. A method of dividing a bulk liquid into drops, comprising the steps of:
(a) delivering a liquid in a range of flow rates into a perforated container so that it will be divided, said container having discharge orifices located at different levels and said liquid having a free surface;
(b) simultaneously controlling the rate of delivery of the liquid depending on the required output per unit of time so that, within the whole range of said control of delivering the liquid, the level thereof in said container varies between the level of location of the uppermost of said discharge orifices and the level of location of the lowermost of said discharge orifices;
(c) causing said liquid to outflow in jets from said discharge orifices of said perforated container;
(d) simultaneously maintaining a constant positive gas pressure over the free surface of the liquid in said perforated container with the whole range of varying the rate of delivering the liquid;
(e) applying a disturbance action to the jets of the liquid so as to form on the surface of said jets capillary waves having a length of from 2.5 to 15 times the diameter of the jets;
(f) using the same gas to produce a positive pressure over the liquid in said perforated container and as a source of disturbance of the liquid jets by exciting in said gas acoustic vibrations, with a frequency of vibration being from 100 to 2000 Hz;
(g) oscillating said perforated container about its vertical axis at a frequency of from 1 to 50 Hz with the amplitude of oscillation of the discharge orifices most remote from said vertical axis being from 1 to 150 mm; and
(h) dividing said liquid jets into drops.

13. A method of dividing a bulk liquid into drops, comprising the steps of:
(a) delivering the liquid in a range of flow rates into a lower part of a perforated container so that it will be divided, said container having discharge orifices located at different levels and said liquid having a free surface, and simultaneously controlling the rate of said delivery of the liquid depending on the required output per unit of time so that within the whole range of said control of delivering the liquid in the level thereof in said container varies between the level of location of the uppermost discharge orifices and the level of location of the lowermost discharge orifices;
(b) causing said liquid to outflow in jets from said discharge orifices of said perforated container;
(c) simultaneously maintaining a constant positive gas pressure over the free surface of the liquid in said perforated container, regardless of the level of said liquid in said container;
(d) controlling the rate of outflow of said jets from said discharge orifices, regardless of the level of said liquid in said container, by continuing to maintain said constant positive gas pressure in said container; and
(e) dividing said liquid jets into drops.

* * * * *

UNITED STATES PATENT AND TRADEMARK OFFICE
CERTIFICATE OF CORRECTION

PATENT NO. : 4,585,167
DATED : April 29, 1986
INVENTOR(S) : Boris Georgievich Kholin It is certified that error appears in the above-identified patent and that said Letters Patent is hereby corrected as shown below: On the Title Page.

On the face of the patent: it should be stated that the invention or application has been assigned to SUMSKY FILIAL KHARKOVSKOGO ORDENA LENINA POLITEKHNI-CHESKOGO INSTITUTA IMENI V.I. LENINA, Sumy, U.S.S.R.

Signed and Sealed this

Twenty-third Day of February, 1988

*Attest:*

DONALD J. QUIGG

*Attesting Officer*     *Commissioner of Patents and Trademarks*